US010202174B2

(12) United States Patent
Dagher et al.

(10) Patent No.: US 10,202,174 B2
(45) Date of Patent: Feb. 12, 2019

(54) BUOY WITH INTEGRATED MOTION COMPENSATION

(71) Applicant: University of Maine System Board of Trustees, Bangor, ME (US)

(72) Inventors: Habib J. Dagher, Bangor, ME (US); Neal Pettigrew, Bangor, ME (US); Anthony M. Viselli, Bangor, ME (US); Rachael Joyce, Bangor, ME (US); John Wallinga, Bangor, ME (US); Patrick Fikes, Bangor, ME (US); Neil R. Fisher, Bangor, ME (US)

(73) Assignee: University Of Maine System Board Of Trustees, Bangor, ME (US)

( * ) Notice: Subject to any disclaimer, the term of this patent is extended or adjusted under 35 U.S.C. 154(b) by 0 days.

(21) Appl. No.: 15/501,012

(22) PCT Filed: Aug. 12, 2015

(86) PCT No.: PCT/US2015/044818
§ 371 (c)(1),
(2) Date: Feb. 1, 2017

(87) PCT Pub. No.: WO2016/025576
PCT Pub. Date: Feb. 18, 2016

(65) Prior Publication Data
US 2017/0225750 A1     Aug. 10, 2017

Related U.S. Application Data

(60) Provisional application No. 62/036,342, filed on Aug. 12, 2014.

(51) Int. Cl.
*B63B 22/20* (2006.01)
*B63B 22/04* (2006.01)
(Continued)

(52) U.S. Cl.
CPC .............. *B63B 22/20* (2013.01); *B63B 22/04* (2013.01); *G01P 5/00* (2013.01); *G01S 17/58* (2013.01);
(Continued)

(58) Field of Classification Search
CPC ........... B63B 2022/006; B63B 2211/02; B63B 2035/4453; B63B 2035/446; B63B 35/00; G01S 17/58
See application file for complete search history.

(56) References Cited

U.S. PATENT DOCUMENTS 7,311,000 B2 * 12/2007 Smith ..................... G01S 17/58
73/170.11
8,866,322 B2 * 10/2014 Tchoryk, Jr. .............. G01P 5/26
290/44
(Continued)

FOREIGN PATENT DOCUMENTS

KR         20090015263 A      2/2009

*Primary Examiner* — Andrew Polay
(74) *Attorney, Agent, or Firm* — MacMillan, Sobanski & Todd, LLC

(57) ABSTRACT

A floating buoy includes a buoy hull having a tower that extends outwardly from the hull. A plurality of sensors are mounted either on the buoy hull, within the buoy hull, and/or on the tower. The plurality of sensors includes at least one met-ocean sensor, at least one ecological sensor, and at least one wind speed measurement sensor. The floating buoy further includes an autonomous power system that is configured to provide electrical power to each of the plurality of sensors. The wind speed measurement sensor may be a Light Detection and Ranging (LiDAR) wind speed measurement sensor, a surface level wind speed sensor, an ultrasonic wind speed sensor, or SODAR.

15 Claims, 8 Drawing Sheets

(51) Int. Cl.
*G01P 5/00* (2006.01)
*G01S 17/58* (2006.01)
*B63B 22/00* (2006.01)

(52) U.S. Cl.
CPC ..... *B63B 2022/006* (2013.01); *B63B 2209/18* (2013.01); *B63B 2211/02* (2013.01)

(56) References Cited

U.S. PATENT DOCUMENTS

2014/0300888 A1* 10/2014 Duffey .................... G01S 17/58
356/28
2016/0018434 A1* 1/2016 Peppas ..................... G01P 5/02
73/195

* cited by examiner

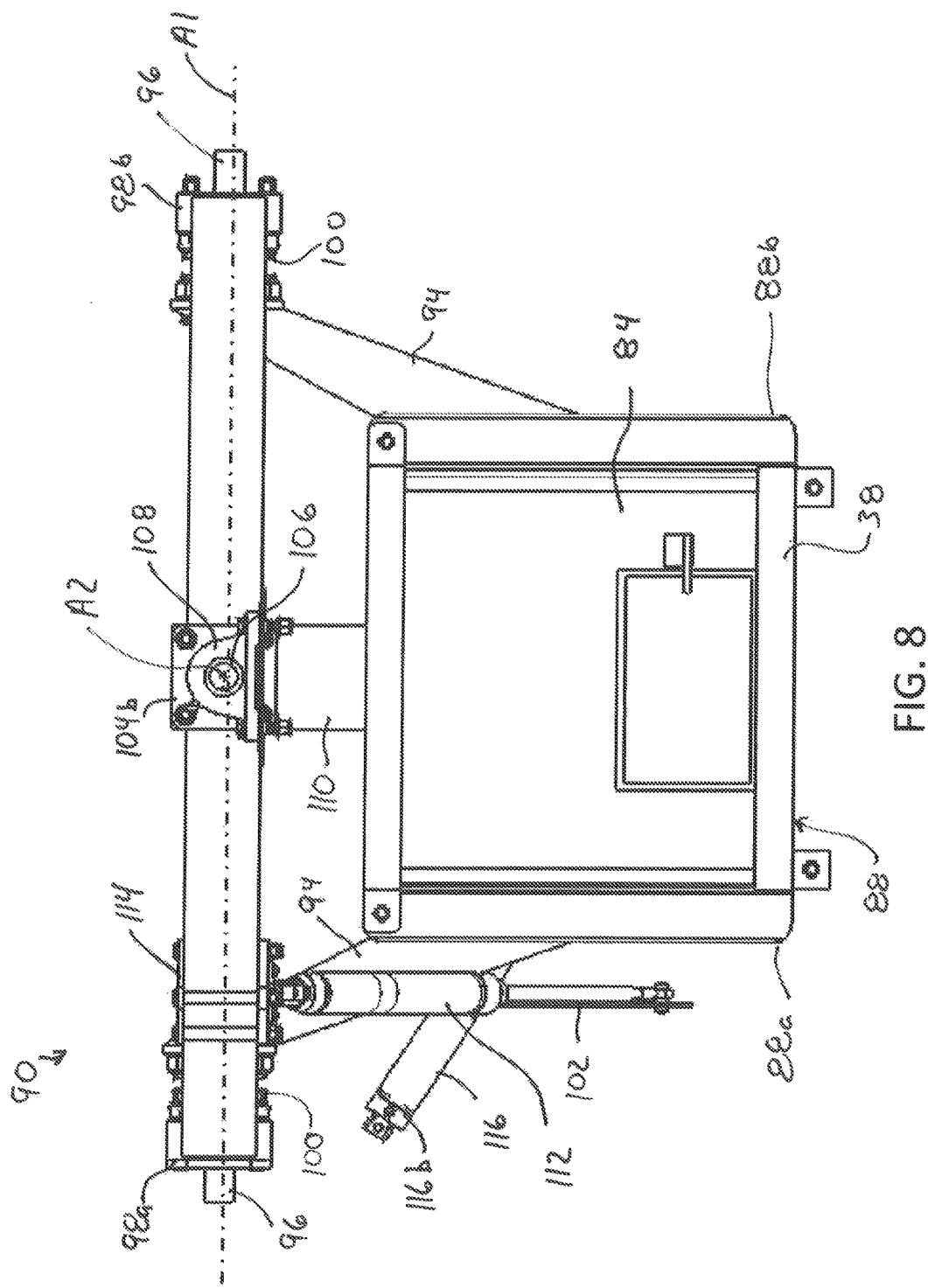

BUOY WITH INTEGRATED MOTION COMPENSATION

CROSS REFERENCE TO RELATED APPLICATIONS

This application claims the benefit of U.S. Provisional Application No. 62/036,342, filed Aug. 12, 2014.

BACKGROUND

This invention relates in general to floating buoys having a variety of data collection devices collecting data that is useful for offshore wind turbines. In particular, this invention relates to an improved structure for a floating buoy that includes one or more of the sensors required to evaluate wind farm site locations, generate meteorological and met-ocean data useful for the design wind turbines, and operate and maintain offshore wind turbines, and further includes means to mitigate the negative effects of motion caused by waves on remote wind sensing equipment that is capable of measuring wind speed at wind turbine hub heights of about 100 m and higher, such as LiDAR wind speed measurement equipment or SODAR.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-base wind turbines due to obstacles such as hills, woods, and buildings.

Groups of wind turbines may also be located offshore, but near the coast at locations where water depths allow the wind turbines to be fixedly attached to a foundation on the seabed, such as a depth of up to about 25 meters. Floating wind turbine platforms are also beginning to be deployed in the ocean between 37 and 93 kilometers offshore and at depths of over 60 meters.

Known offshore wind turbine platforms require information such as wind speed, met-ocean data, and ecological data for wind farm site evaluation, wind turbine design, and wind turbine operation and maintenance. Although sensors for gathering such data are known, such sensors are typically mounted on multiple platforms, such as fixed towers, buoys, and the fixed or floating wind turbine platforms. For example, wind speed measurement sensors, such as Light Detection and Ranging (LiDAR) may be mounted on a buoy or fixed platform. One or more sensors configured to collect met-ocean data such as wave height, period, and direction, current speed through water depth, and wind direction and speed measurements at about 4 m above mean sea level, air pressure and temperature, water temperature and salinity, and other oceanographic data may be provided on one or more buoys or fixed towers. Additional buoys or fixed towers may be provided with sensors configured to collect data on the activity of birds, bats, fish, marine mammals, and other wildlife. During wind farm operation, similar sensors may be mounted to the turbine platform itself for monitoring purposes.

Accordingly, there is a need in the art for improved platforms that can house all of the sensors required to evaluate wind farm site locations, design wind turbines, collect ecological data, and operate and maintain wind turbines. There is also a need in the art for an improved floating platform for a LiDAR device that can mitigate the negative effects of motion caused by waves.

SUMMARY OF THE INVENTION

This invention relates to an improved structure for a floating buoy that includes all of the sensors required to evaluate wind farm site locations, design wind turbines, and operate and maintain offshore wind turbines, and further includes means to mitigate the negative effects of motion caused by waves on remote wind sensing equipment such as LiDAR wind speed measurement equipment. In one embodiment, the floating buoy includes a buoy hull having a tower that extends outwardly from the hull. A plurality of sensors are mounted either on the buoy hull, within the buoy hull, and/or on the tower. The plurality of sensors includes at least one met-ocean sensor, at least one ecological sensor, and at least one wind speed measurement sensor. The floating buoy further includes an autonomous power system that is configured to provide electrical power to each of the plurality of sensors. The wind speed measurement sensor may be a Light Detection and Ranging (LiDAR) wind speed measurement sensor, a surface level wind speed sensor, an ultrasonic wind speed sensor, or SODAR.

In another embodiment, a floating buoy includes a buoy hull having a tower that extends outwardly from the hull. A gimbal is mounted to the tower, and a Light Detection and Ranging (LiDAR) wind speed measurement sensor is mounted within the gimbal about two axes of rotation. The floating buoy further includes an autonomous power system configured to provide electrical power to the LiDAR wind speed measurement sensor.

Various advantages of the invention will become apparent to those skilled in the art from the following detailed description, when read in view of the accompanying drawings.

BRIEF DESCRIPTION OF THE DRAWINGS

FIG. 8 is an elevational view of the LiDAR wind speed measurement sensor and associated gimbal illustrated in FIGS. 6 and 7.

DETAILED DESCRIPTION

Figure 1:
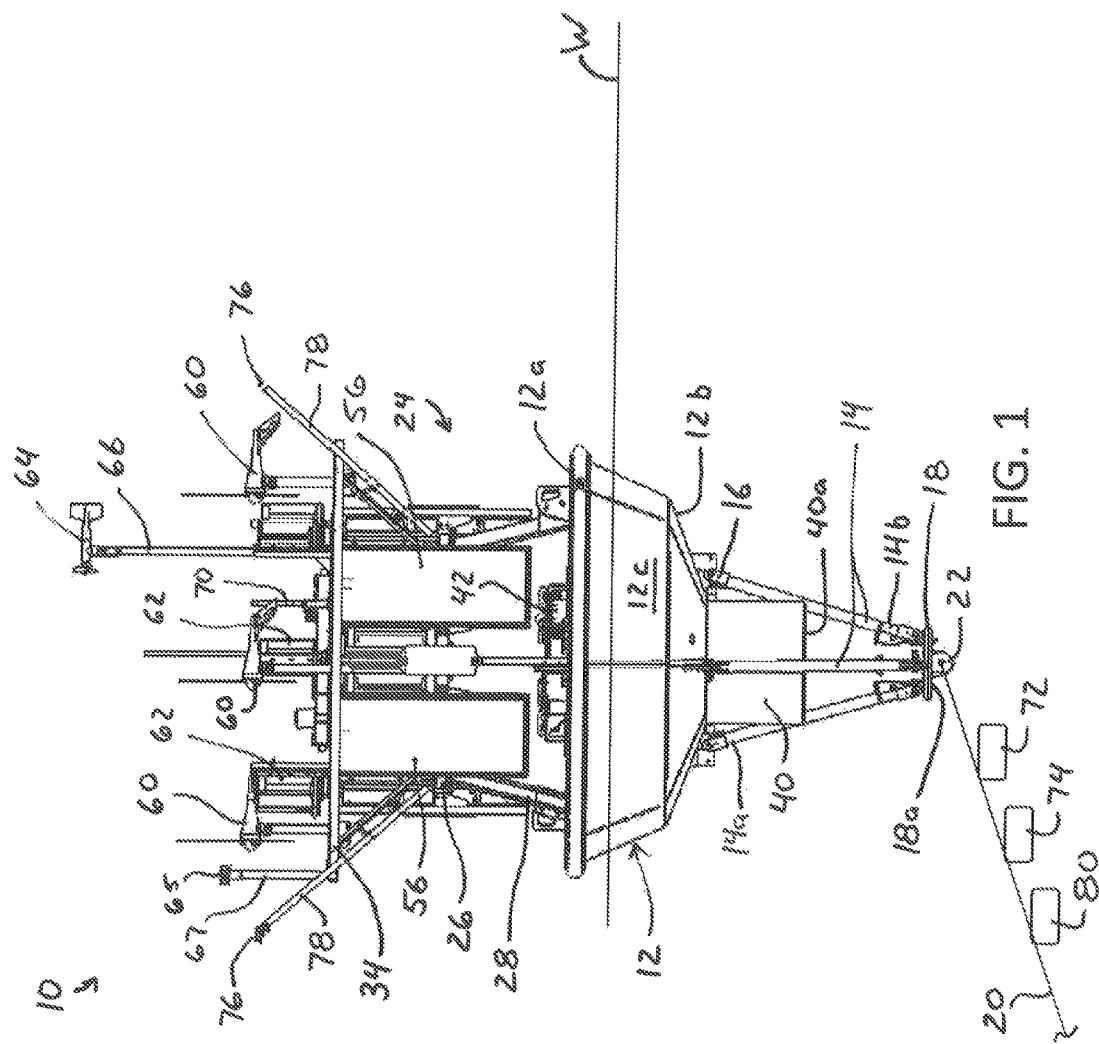
FIG. 1 is an elevational view of a floating buoy in accordance with this invention.

Referring now to the drawings, there is illustrated in FIG. 1 a buoy 10 that includes a plurality of sensors in accordance with the present invention. The embodiments of the invention disclosed below generally provide improvements to a floating buoy that housing the sensors required to evaluate wind farm site locations at hub heights of about 100 m and higher, design wind turbines, and operate and maintain wind turbines. The improved floating buoy 10 also includes means to mitigate the negative effects of motion caused by waves on remote wind sensing equipment such as a Light Detection and Ranging (LiDAR) wind speed measurement sensor 82, described in detail below, mounted on the buoy 10. The improved floating buoy 10 may be configured to provide the data collected by the sensors to a computer server on-shore, an offshore monitoring station, or to one or more fixed or floating off shore wind turbine platforms.

The illustrated buoy 10 is a wave rider type buoy configured to follow a wave profile when in a body of water; i.e., move with the waves. More specifically, the illustrated buoy 10 is a discus type wave rider type buoy. The buoy 10 includes a wave following hull 12 configured for floating in a body of water. The hull 12 has a hull deck or first side 12a (upwardly facing when floating in a body of water and when viewing FIG. 1), a second side 12b (downwardly facing when floating in a body of water and when viewing FIG. 1), and a watertight hull wall 12c that defines a hull interior 12d. A plurality of support legs 14 have a first end 14a and a second end 14b, and extend outwardly (downwardly when viewing FIG. 1) from the second side 12b of the hull 12. The first ends 14a of the support legs 14 are connected to the second side 12b of the hull 12 via removable fasteners, such as bolts, at brackets 16. The second ends 14b of the support legs 14 are connected to a plate defining a mooring bridle 18. In the illustrated embodiment, the buoy 10 includes three support legs 14. Alternatively, the buoy 10 may include any desired number of support legs 14.

One or more mooring lines 20, described in detail below, may be attached to a mooring line attachment member 22 on an outwardly facing surface 18a (downwardly facing when viewing FIG. 1) of the mooring bridle 18. The hull 12, the support legs 14, and the mooring bridle 18 may be connected together by any desired means, such as with threaded fasteners (e.g., bolts), rivets, or by welding.

Figure 4:
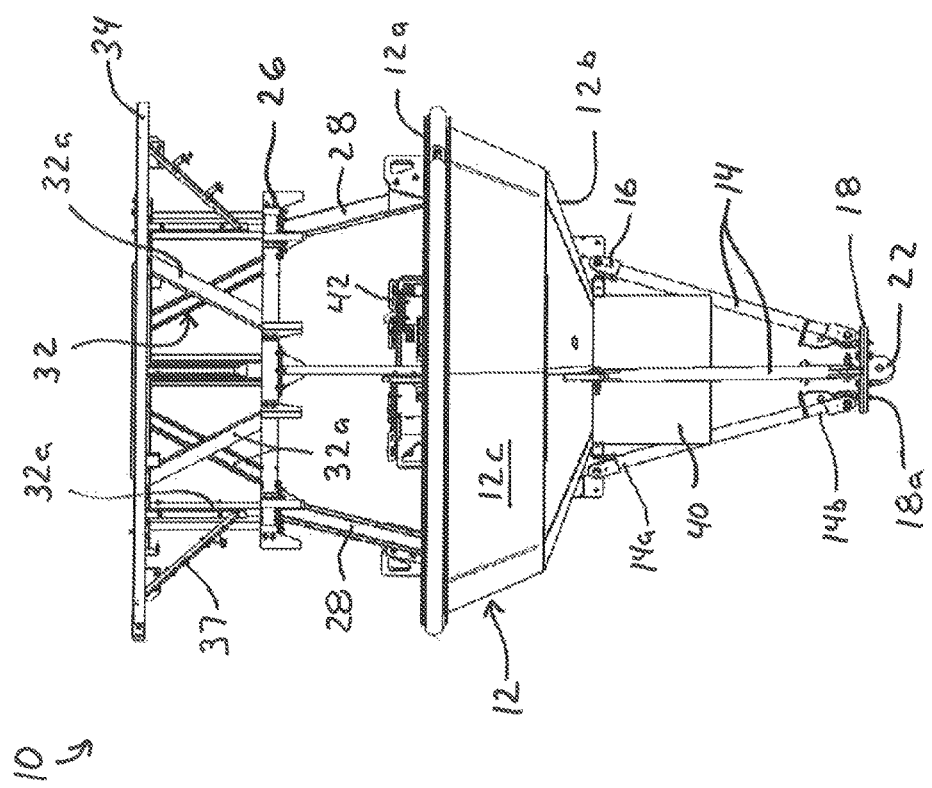
FIG. 4 is an elevational view of the buoy hull and tower illustrated in FIGS. 1 through 3.
Figure 5:
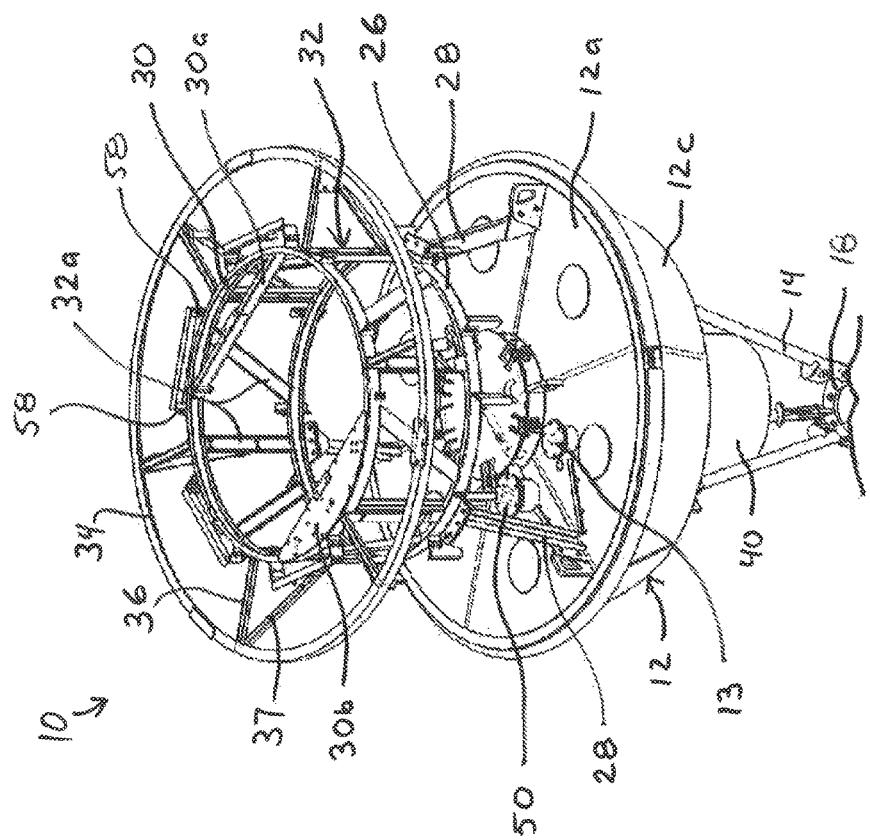
FIG. 5 is a perspective view of the buoy hull and tower illustrated in FIGS. 1 through 3.

A buoy frame or tower 24 extends outwardly (upwardly when viewing FIGS. 4 and 5) from the first side 12a of the hull 12. The tower 24 may have any desired shape and size configured to have a plurality of combinations of sensors, such as met-ocean sensors, ecological sensors, and remote wind speed sensors, all described below in detail, attached thereto. As shown in FIGS. 4 and 5, generally horizontally oriented structural members of the tower 24 have a generally circular shape. As shown, the tower 24 includes a first tower ring 26 connected to the first side 12a of the hull 12 by a plurality of radially arranged first tower legs 28. A second tower ring 30 is connected to the first tower ring 26 by a radially arranged lattice 32 having a plurality of lattice members 32a. An upper outer ring 34 is substantially co-planar with the second tower ring 30. The upper outer ring 34 has a diameter larger than the second tower ring 30 and is connected to the second tower ring 30 by a plurality of radially arranged first connection members 36. The second tower ring 30 also includes gimbal attachment members 30a and 30b. The upper outer ring 34 is further connected to the tower 24 by a plurality of second connection members 37 that extend upwardly and outwardly from a substantially vertical one of the lattice members 32a. The upper outer ring 34 is also configured for the attachment of modular sensor bracket mounts.

If desired, one or more watertight instrumentation hatches 13 may be provided in the first side 12a of the hull 12, as shown in FIG. 5. The instrumentation hatch 13 provides access to any sensor or other device located with the hull interior 12d.

The buoy 10, the tower 24, and the components thereof may be formed from any desired material, such as aluminum, steel, a composite material, or combinations thereof. The tower rings 26 and 30, the upper outer ring 34, the tower legs 28, 32, and 36, and the hull 12 may be connected together by any desired means, such as with threaded fasteners (e.g., bolts), rivets, or by welding.

Figure 3:
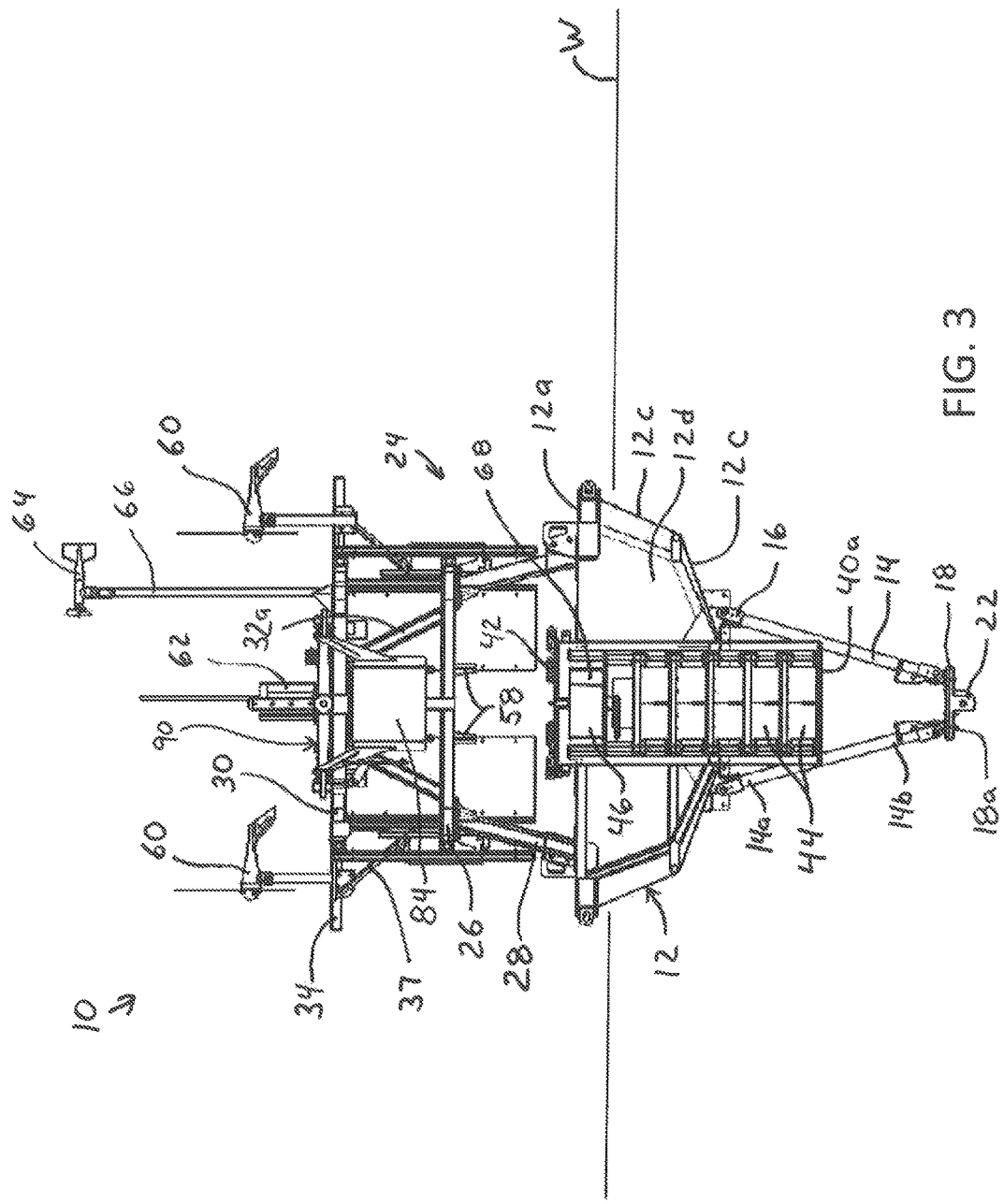
FIG. 3 is a cross sectional view taken along the line 3-3 of FIG. 2.

A watertight, substantially cylindrical battery storage housing or bank 40 is formed within the hull interior 12d and extends outwardly (downwardly when viewing FIGS. 1 and 3) from the second side 12b of the hull 12. The battery storage bank 40 includes a watertight access hatch 42 on the first side 12a of the hull 12, and defines a substantially flat hull support surface 40a at a lower end thereof. The battery storage bank 40 is configured to house any desired number of batteries 44 and other components, such as a data acquisition system 46. As best shown in FIGS. 1 and 3, a majority of the battery storage bank 40, and the batteries 44 contained within the battery storage bank 40, extend below the waterline W to ensure that a temperature within the battery storage bank 40 is maintained at a desired, consistent level, such as within the range of about 25° C. to about 0° C., year around. Advantageously, the battery storage bank 40 and the batteries 44 contained therein also act as stabilizing fixed ballast for the buoy 10. Ballast, such as the batteries 44 is arranged within the battery storage bank 40 such that the ballast will be at a desired depth relative to the waterline W to achieve a desired stability in pitch and roll while the hull 12 of the buoy 10 maintains the characteristics of typical wave rider type buoy for measuring waves.

The support legs 14 may be disconnected and removed from the hull 12 at the brackets 16. Removal of the legs 14, and the attached mooring bridle 18, allows the hull support surface 40a of the buoy 10 to be easily placed upon a substantially flat surface such as the deck of a vessel, a dock or pier, or other substantially flat surface.

A safety purge valve 50 may be provided to release dangerous gases that may be formed and accumulate in the battery storage bank 40. As best shown in FIG. 5, the safety purge valve 50 extends outwardly (upwardly when viewing FIG. 5) from the first side 12a of the hull 12. Although not shown in FIG. 5, the safety purge valve 50 may include a tube that extends outwardly and upwardly from the battery storage bank 40 a desired distance to an upper portion of the tower 24 where the tube is bent about 180 degrees such that a distal end of the tube is oriented toward the first side 12a of the hull 12. The distal end of the tube includes a one-way flap valve configured such that under the force of gravity the flap valve is open to the atmosphere, but closes upon wave impact to protect the interior of the tube and the battery storage bank 40 from moisture.

The one or more mooring line 20 is attached to the mooring line attachment member 22 and further anchored to the seabed (not shown) by anchors (not shown), in a conventional manner. The mooring line 20 may be formed from any desired material. Non-limiting examples of suitable mooring line material include steel rope or cable, steel chain segments, and synthetic rope such as nylon.

The illustrated buoy 10 includes an autonomous power system that is independent of external power networks and that generates the energy required to operate its various sensors. This autonomous power system is especially useful in remote and near-shore at-sea applications, where power from shore is unavailable or inaccessible. The buoy 10 generates power from wind and solar energy, and stores the energy generated in the batteries 44. Generating power from wind and solar energy provides power generation redundancy and allows for power generation during low wind and low sunlight conditions.

Figure 2:
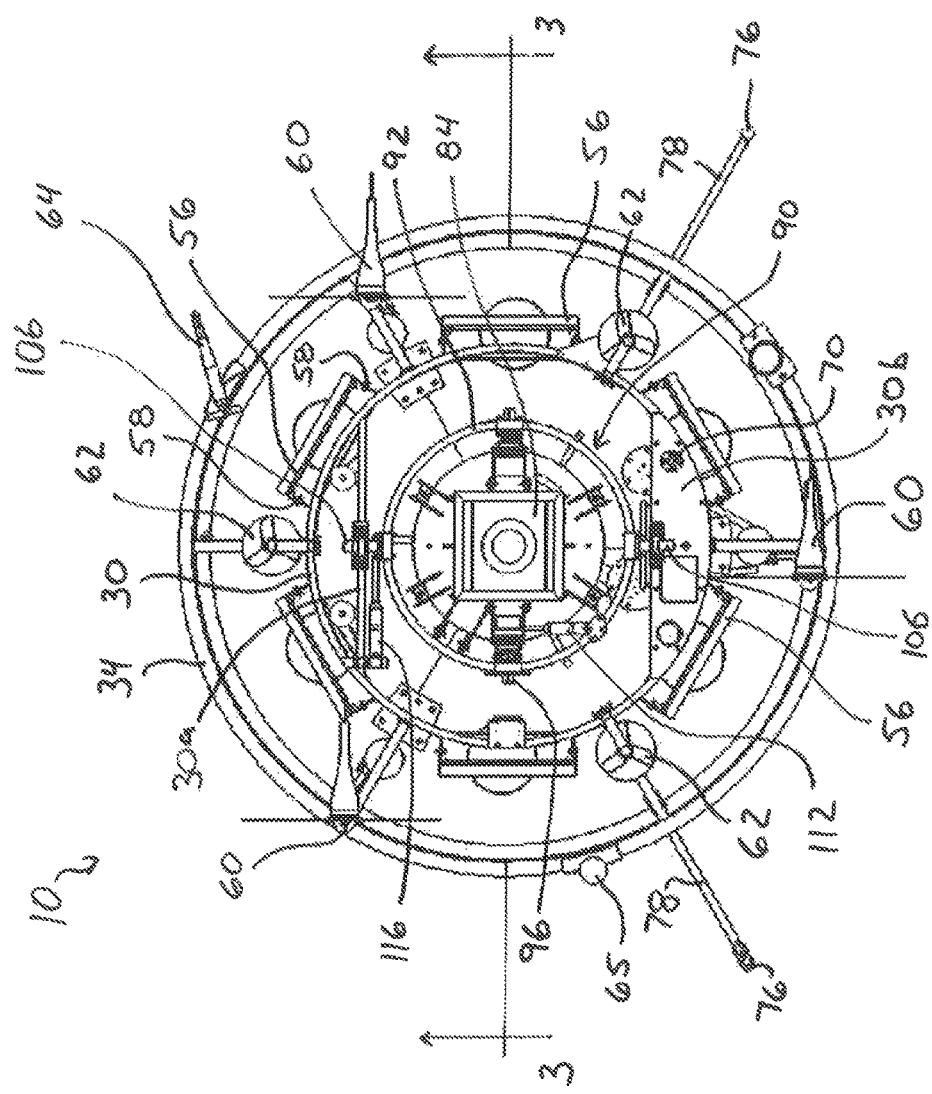
FIG. 2 is a top plan view of the floating buoy illustrated in FIG. 1.

A plurality of solar panels 56 generate power to charge the batteries 44 and may be attached to the tower 24 by any desired means. In the illustrated embodiment, and as best shown in FIGS. 1 and 2, the solar panels 56 are positioned circumferentially around the tower 24 and are attached to the first and second tower rings 26 and 30 by brackets 58, such that the solar panels 56 are oriented radially outwardly of the first and second tower rings 26 and 30. The brackets 58 may be adjustable so that an angle of each solar panel 56 relative to the tower 24 may be selected based on the deployment latitude of the buoy 10. As shown, the solar panels 56 extend from the first tower ring 26 toward the first side 12a of the hull 12 (downwardly when viewing FIGS. 1 and 3). The solar panels 56 thus have the additional benefit of providing protection to sensitive remote wind sensing instruments mounted within the tower 24 and described below, from the negative effects of waves and other environmental forces, such as wind, rain, snow, and ice. In the illustrated embodiment, six solar panels 56 are shown. Alternatively, any desired number of solar panels 56 may be provided.

A plurality of wind turbine power generators are also attached to the tower 24. The illustrated buoy 10 includes both horizontal axis wind generators 60 and vertical axis wind generators 62, both of which generate power to charge the batteries 44. As shown, three horizontal axis wind generators 60 are attached to the first connection members 36 and extend upwardly above a plane defined by the upper outer ring 34. Additionally, three vertical axis wind generators 62 are attached to the second tower ring 30, and also extend upwardly above a plane defined by the upper outer ring 34. Although three horizontal axis wind generators 60 and three vertical axes wind generators 62 are shown, it will be understood that any number of the horizontal and vertical axis wind generators 60 and 62, respectively, may be provided. Additionally, the horizontal and vertical axis wind generators 60 and 62 may be mounted to any other desired locations on the tower 24. An onboard generator (not shown) such as a generator powered by diesel fuel or by any other fuel type, may also be used to supplement the power generation equipment.

Advantageously, the autonomous power system of the buoy 10 is robust enough that the buoy may be deployed for periods of between six months and one year between routine maintenance of the autonomous power system.

The buoy 10 includes a plurality of met-ocean sensors configured to collect wave and climate or met-ocean data. For example, the met-ocean sensors may collect data relating to wave height, period, and direction, current speed and direction through water at various depths, wind speed measurements at about 4 m above the mean sea level, air pressure and temperature, water temperature and salinity, and other desired ocean conditions. This met-ocean data may be used to design a wind turbine, a wind turbine tower, a wind turbine foundation, a floating wind turbine platform, the layout of a wind turbine farm, and the electrical infrastructure for wind turbines and wind turbine farms. The met-ocean data may also be used for in-situ monitoring of wind farms.

In the illustrated embodiment, the met-ocean sensors include one or more surface level wind speed sensors 64. As shown, one surface level wind speed sensor 64 is mounted on an elongated rod 66 that extends outwardly (upwardly when viewing FIGS. 1 and 3) from the upper outer ring 34. The rod 66 may be attached to the upper outer ring 34 by any desired means, such as with threaded fasteners (e.g., bolts), rivets, or by welding. The surface level wind speed sensor 64 may also be mounted to any other desired location or locations on the tower 24. One or more ultrasonic or sonic wind speed sensors 65, such as SODAR, may also be provided. As shown, one wind sensor 65 is mounted on an elongated rod 67 that also extends outwardly (upwardly when viewing FIGS. 1 and 3) from the upper outer ring 34. The rod 67 may be attached to the upper outer ring 34 by any desired means, such as with threaded fasteners (e.g., bolts), rivets, or by welding. The wind sensor 65 may also be mounted to any other desired location or locations on the tower 24.

A wave height, wave period, and wave direction sensor 68 is provided and housed within the data acquisition system 46. In the illustrated embodiment of the buoy 10, the wave height, wave period, and wave direction sensor 68 is an accelerometer, although other types of sensors may be used. The wave height, wave period, and wave direction sensor 68 may also be mounted at other locations within the hull 12.

The met-ocean sensors also include one or more air pressure and temperature sensor 70. As shown, the air pressure and temperature sensor 70 is an elongated device that extends outwardly (upwardly when viewing FIGS. 1 and 3) from the second tower ring 30. The air pressure and temperature sensor 70 may be attached to the second tower ring 30 by any desired means, such as with threaded fasteners (e.g., bolts), rivets, or by welding. The air pressure and temperature sensor 70 may also be mounted to any other desired location or locations on the tower 24.

The met-ocean sensors further include a water temperature sensor 72 and a current speed and direction sensor 74 mounted to the buoy 10 below the waterline W. Each of the water temperature sensor 72 and the current speed and direction sensor 74 are attached to the mooring line 20, as shown schematically in FIG. 1.

The buoy 10 also includes a plurality of ecological sensors configured to collect ecological data. For example, the ecological sensors may collect data relating to bird, bat, fish, and marine mammal activity. This ecological data may be used to ensure compliance with government environmental requirements and to complete environmental impact studies and environmental impact statements.

In the illustrated embodiment, the ecological sensors include two bird/bat acoustic monitoring sensors 76. As shown, each bird/bat acoustic monitoring sensor 76 is mounted on an elongated rod 78 that extends diagonally outwardly and upwardly from the second tower ring 30 such that the bird/bat acoustic monitoring sensor 76 is radially outward and above the plane defined by the upper outer ring 34. The rod 78 may also be attached to the upper outer ring 34. Each rod 78 may be attached to the second tower ring 30 and the upper outer ring 34 by any desired means, such as with threaded fasteners (e.g., bolts), rivets, or by welding. The bird/bat acoustic monitoring sensor 76 may also be mounted to any other desired location or locations on the tower 24.

The ecological sensors further include a fish acoustic tracking sensor 80 mounted to the buoy 10 below the waterline W. The fish acoustic tracking sensor 80, like the water temperature sensor 72 and the current speed and direction sensor 74, is attached to the mooring line 20, and also shown schematically in FIG. 1.

It may also be desirable to monitor marine mammal activity at or near the buoy 10. Accordingly, one or more acoustic sensors may be provided on, within, or below the buoy 10 or on the tower 24 configured to detect marine mammals. Additionally, radio frequency (RF) receivers may be provided on, within, or below the buoy 10 or on the tower 24 configured to detect RF signals from marine mammals that have been tagged with RF transmitters.

It will be understood that each of the sensors and power generation devices mounted to the buoy 10 may be connected to the source of electrical power, typically the batteries 44 in the battery storage bank 40, by one or more electrical cables (not shown). Such electrical cables may include quick disconnect type connectors for ease in sensor replacement while the buoy 10 is deployed in a body of water such as an ocean.

Figure 6:
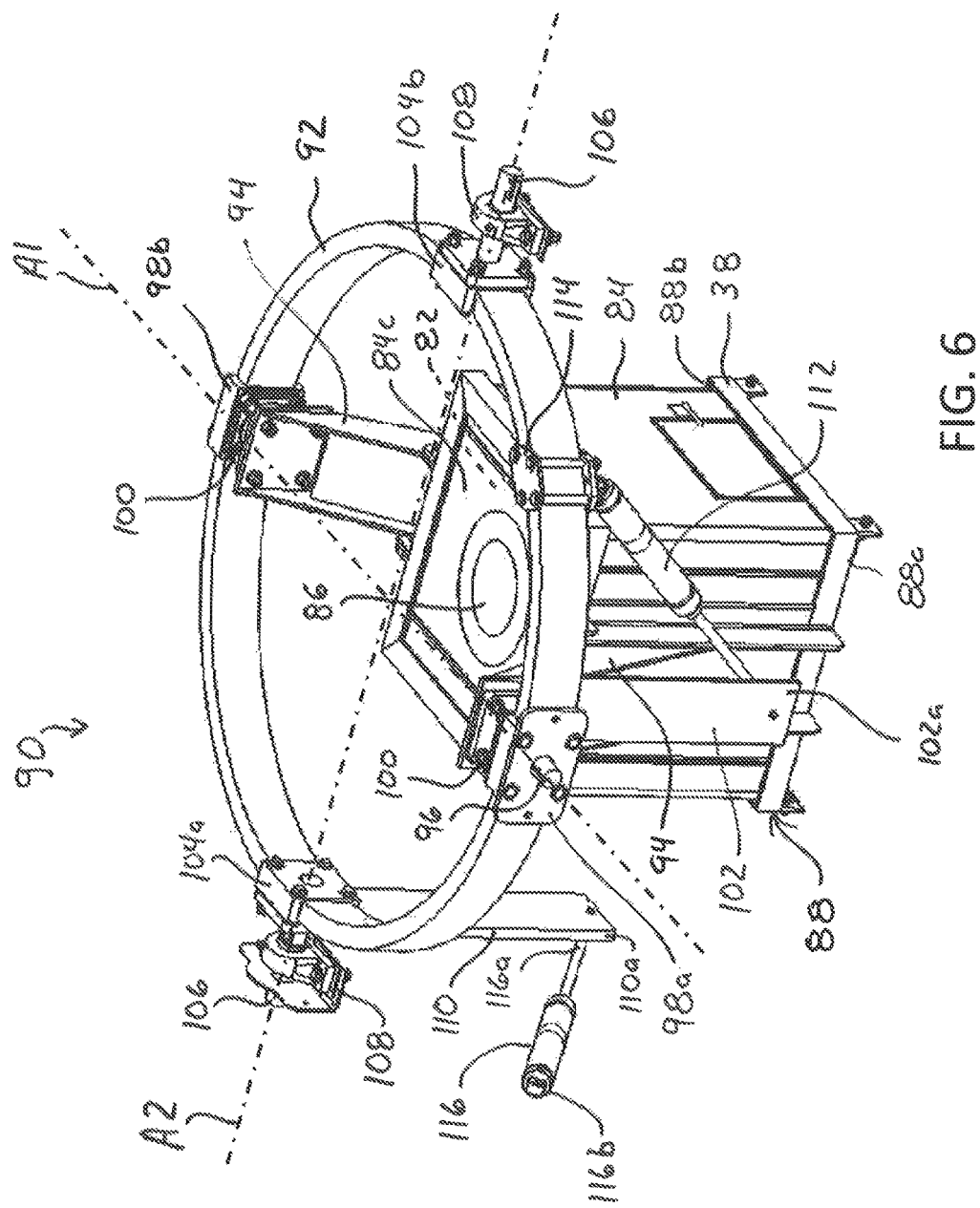
FIG. 6 is an enlarged perspective view of the LiDAR wind speed measurement sensor and associated gimbal shown in FIGS. 1-3.

The buoy 10 may further include a LiDAR wind speed measurement sensor 82. The LiDAR wind speed measurement sensor 82 is mounted within a LiDAR housing 84 having a lens 86. The lens 86 is positioned on a first side 84a (the upwardly facing side when viewing FIGS. 6-8) of the LiDAR housing 84. The LiDAR housing 84 is securely mounted within a LiDAR chassis 88. Additionally, if desired, a protective bumper 38 may be attached to one or more sides of the LiDAR chassis 88. The bumper 38 is configured prevent impact between the LiDAR chassis 88 and any of the tower mounted sensors described below when the LiDAR chassis 88, and the LiDAR wind speed measurement sensor 82 contained therein, are moving within the gimbal 90, described below. Additionally, the position and radial arrangement of the solar panels 56 ensures that a required line of sight through the lens 86 of the LiDAR is maximized.

The LiDAR wind speed measurement sensor 82 operates best when the platform upon which it is mounted is relatively stable. A wave rider type buoy, such as the buoy 10, moves with or follows the wave profile of waves in the body of water in which the buoy 10 is deployed.

To mitigate the negative effects of motion caused by waves on the buoy 10, and therefore on the LiDAR wind speed measurement equipment 82 mounted therein, the LiDAR chassis 88 is further mounted within an improved gimbal 90. The improved gimbal 90 includes an outer gimbal ring 92. Chassis frame arms 94 have a first or lower end 94a and a second or upper end 94b, and extend outwardly and upwardly from opposite side portions 88a and 88b of the LiDAR chassis 88. The upper ends 94b of the chassis frame arms 94 include a radially outwardly extending pivot shaft 96 and are pivotally attached to the outer gimbal ring 92 at first pivot brackets 98a and 98b. The pivot shafts 96 also extend through, and are supported by, a bearing mount 100 attached between the upper ends 94b of the frame arms 94 and the gimbal ring 92. The first pivot brackets 98a and 98b are positioned 180 degrees apart and define a first or inner rotational axis A1. An elongated first mounting member 102 extends downwardly from the frame arm 94 on the side portion 88a of the LiDAR chassis 88. The first mounting member 102 pivots with the LiDAR chassis 88 about the inner rotational axis A1.

The outer gimbal ring 92 also includes second pivot brackets 104a and 104b. The second pivot brackets 104a and 104b include a radially outwardly extending pivot shaft 106. The pivot shafts 106 also extend through, and are supported by, a bearing mount 108. The second pivot brackets 104a and 104b are positioned 180 degrees apart and define a second or outer rotational axis A2. A second mounting member 110 extends downwardly from the outer gimbal ring 92 at the second pivot bracket 104a. The second mounting member 110 pivots with the outer gimbal ring 92 about the outer rotational axis A2. As best shown in FIGS. 2 and 5, the bearing mounts 108 are mounted to the gimbal attachment members 30a and 30b.

An inner rotational axis damper 112 extends laterally and upwardly from a lower end 102a of the first mounting member 102 and is attached to the outer gimbal ring 92 by a bracket 114 at a point between the first pivot bracket 98a and the second pivot bracket 104b. If desired, a second one of the inner rotational axis dampers 112 may be provided on the opposite chassis frame arm 94 at the first pivot bracket 98b.

An outer rotational axis damper 116 is connected at a first end 116a thereof to a lower end 110a of the second mounting member 110 and at a second end 116b to the second tower ring 30. If desired, a second one of the outer rotational axis dampers 116 may be provided at the second pivot bracket 104b.

As the buoy 10 moves with the movement of waves, the gimbal 90 operates to keep the LiDAR housing 84, and the LiDAR wind speed measurement sensor 82 therein, upright by allowing the LiDAR chassis 88 to simultaneously pivot about the inner rotational axis A1 and the outer rotational axis A2.

In the illustrated embodiment, the inner and outer rotational axis dampers 112 and 116 are pneumatic piston type dampers. Advantageously, the inner and outer rotational axis dampers 112 and 116 are also tunable, such that the operation of the gimbal 90; i.e., the amount of rotation about the inner rotational axis A1 and the outer rotational axis A2, may be configured for optimal performance in the unique and widely varying wave conditions in which the buoy 10 may operate, such as in a harbor where wave heights may be relatively low, and also in the open ocean where wave heights may be relatively high.

Alternatively, a tunable torsional damper (not shown) may be provided at the pivot shafts 96 and 106. Any suitable torsional damper, such as a viscous shearing type damper, may be provided. If desired, one or more torsional dampers may be provided in combination with one or more of the inner and outer rotational axis dampers 112 and 116 described above.

Figure 7:
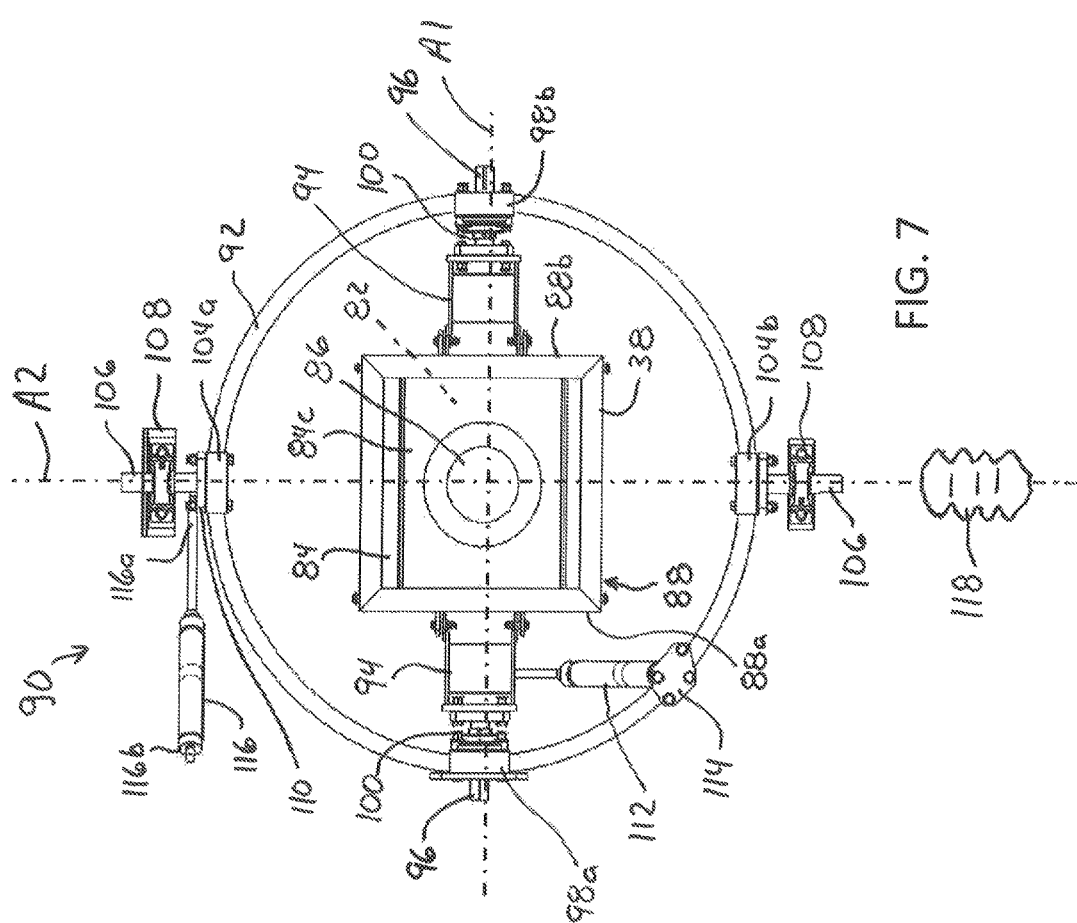
FIG. 7 is a top plan view of the LiDAR wind speed measurement sensor and associated gimbal illustrated in FIG. 6.

If desired, a protective resilient boot 118, as shown in FIG. 7, may be mounted around the bearing mount 100 and the pivot shaft 96, and around the bearing mount 108 and the pivot shaft 106, to protect the rotational components from the negative effects of the environment. The protective resilient boot 118 may be formed from an elastomeric material, such as rubber. Alternatively, the protective resilient boot 118 may be formed from any other deformable material, such as urethane, nitrile, or other polymers.

The principle and mode of operation of the invention have been described in its preferred embodiments. However, it should be noted that the invention described herein may be practiced otherwise than as specifically illustrated and described without departing from its scope.

What is claimed is:

1. A floating buoy comprising:
    a buoy hull;
    a tower attached to the hull, the tower including a plurality of tower legs extending outwardly from the hull, and at least one annular member attached to the legs and substantially parallel with a deck of the hull;
    a first wind speed measurement sensor mounted to the tower;
    a plurality of solar panels mounted to the annular member of the tower and arranged circumferentially thereon; and an autonomous power system configured to provide electrical power to each of at least one second sensor;

wherein the wind speed measurement sensor is arranged such that it is mounted within the circumferentially arranged solar panels and between an upper edge and a lower edge of each solar panel; and wherein the at least one second sensor is one of a met-ocean sensor, an ecological sensor, and a second wind speed measurement sensor, and is mounted are on one of the buoy hull, within the buoy hull, and on the tower.

2. The floating buoy according to claim 1, wherein the buoy hull is configured as wave rider type buoy hull.

3. The floating buoy according to claim 1, wherein the met-ocean sensor is one of a surface level wind speed sensor, a wave height, wave period, and wave direction sensor, an air pressure and temperature sensor, a water temperature sensor, and a current speed and direction sensor.

4. The floating buoy according to claim 1, wherein the ecological sensor is one of a bird/bat acoustic monitoring sensor, a fish acoustic tracking sensor, and a marine mammal acoustic monitoring sensor.

5. The floating buoy according to claim 1, wherein the second wind speed measurement sensor is one of a surface level wind speed sensor, an ultrasonic wind speed sensor, and SODAR.

6. The floating buoy according to claim 1, wherein the first wind speed measurement sensor is a Light Detection and Ranging (LiDAR) wind speed measurement sensor.

7. The floating buoy according to claim 1, wherein the autonomous power system includes at least one battery positioned in a watertight battery storage housing in the buoy hull, and wherein a portion of the battery storage housing extends outward of the buoy hull such that the portion of the buoy hull and the at least one battery positioned therein extend below a waterline of a body of water in which the floating buoy is deployed to ensure that a temperature within the battery storage housing is maintained at a consistent level.

8. The floating buoy according to claim 7, wherein the battery storage housing defines a substantially flat hull support surface at a lower end thereof, the substantially flat hull support surface configured to allow the floating buoy to be placed upon a substantially flat surface.

9. The floating buoy according to claim 7, wherein the at least one battery defines ballast.

10. The floating buoy according to claim 1, wherein the annular member is a first annular member, wherein the floating buoy further includes a second annular member attached to the tower, and wherein the second sensor is mounted to the second annular member.

11. The floating buoy according to claim 10, wherein the first wind speed measurement sensor includes a lens and is attached to the first annular member attached to the hull, and wherein the first wind speed measurement sensor is positioned relative to the second annular member such that a line of sight from the lens through the plurality of sensors is maintained.

12. A floating buoy comprising:
a buoy hull;
a tower attached to the hull, the tower including a plurality of tower legs extending outwardly from the hull, and at least one annular member attached to the legs and substantially parallel with a deck of the hull;
a wind speed measurement sensor mounted to the tower;
a plurality of solar panels mounted to the annular member of the tower and arranged circumferentially thereon; and
an autonomous power system configured to provide electrical power to each of at least one second sensor;
wherein the wind speed measurement sensor is arranged such that it is mounted within the circumferentially arranged solar panels and between an upper edge and a lower edge of each solar panel;
wherein the autonomous power system includes at least one battery positioned in a watertight battery storage housing in the buoy hull; and
wherein a portion of the battery storage housing extends outward of the buoy hull such that the portion of the buoy hull and the at least one battery positioned therein extend below a waterline of a body of water in which the floating buoy is deployed to ensure that a temperature within the battery storage housing is maintained at a consistent level.

13. The floating buoy according to claim 12, wherein the battery storage housing defines a substantially flat hull support surface at a lower end thereof, the substantially flat hull support surface configured to allow the floating buoy to be placed upon a substantially flat surface.

14. The floating buoy according to claim 12, wherein the at least one battery defines ballast.

15. The floating buoy according to claim 12, wherein the wind speed measurement sensor is a first wind speed measurement sensor, and wherein the at least one second sensor is one of a met-ocean sensor, an ecological sensor, and a second wind speed measurement sensor, and is mounted are on one of the buoy hull, within the buoy hull, and on the tower.

* * * * *